United States Patent
Okazawa

(10) Patent No.: US 12,008,280 B2
(45) Date of Patent: Jun. 11, 2024

(54) IMAGE PROCESSING APPARATUS, CONTROL METHOD FOR THE IMAGE PROCESSING APPARATUS, AND STORAGE MEDIUM FOR RECEIVING A PRINT JOB

(71) Applicant: CANON KABUSHIKI KAISHA, Tokyo (JP)

(72) Inventor: Takashi Okazawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/060,353

(22) Filed: Nov. 30, 2022

(65) Prior Publication Data
US 2023/0176800 A1 Jun. 8, 2023

(30) Foreign Application Priority Data
Dec. 2, 2021 (JP) .................................. 2021-196002

(51) Int. Cl.
*G06F 3/12* (2006.01)
(52) U.S. Cl.
CPC .......... *G06F 3/1267* (2013.01); *G06F 3/1205* (2013.01); *G06F 3/1238* (2013.01); *G06F 3/1245* (2013.01); *G06F 3/1288* (2013.01)
(58) Field of Classification Search
None
See application file for complete search history.

(56) References Cited

U.S. PATENT DOCUMENTS

| 2020/0089443 A1* | 3/2020 | Kashiwagi | G06F 3/1288 |
| 2020/0319830 A1* | 10/2020 | Kaneda | G06F 3/1238 |
| 2021/0132886 A1* | 5/2021 | Inoue | G06F 3/1207 |

FOREIGN PATENT DOCUMENTS

JP 2010253724 A 11/2010

OTHER PUBLICATIONS

Smith Kennedy; Working Draft—IPP Enterprise Printing Extensions v2.0 (EPX); The Printer Working Group; Apr. 23, 2021 Working Draft; pp. 1-68.

* cited by examiner

*Primary Examiner* — Thomas D Lee
(74) *Attorney, Agent, or Firm* — Canon U.S.A., Inc. IP Division

(57) ABSTRACT

A multi-function peripheral (MFP) manages data corresponding to a print job received from an outside, and has a plurality of output management functions including at least a first output management function and a second output management function different from the first output management function as output management functions of outputting the managed data in accordance with an operation performed by a user. The MFP sets which output management function of the plurality of output management functions handles a print job that satisfies a predetermined condition based on a user operation and, in a case where a print job that satisfies the predetermined condition is received, performs control such that data corresponding to the received print job is managed in association with the set output management function.

11 Claims, 15 Drawing Sheets

FIG.5A

PRINT

PLEASE SELECT JOB.

INDIVIDUAL ▼

| ✓ JOB NAME/PRINT SETTING | WAIT FOR PRINTING | PRINTED | RESERVED PRINTING | |
|---|---|---|---|---|
| | DAY AND TIME ▼ | NUMBER OF PAGES × NUMBER OF COPIES | ESTIMATED TIME / USER NAME | |
| ☐ 1200J10.xls<br>■/■ A4  🖨 1 | 05/12<br>16:38:40 | 5 | ×1 | Alice |
| ☐ J11.ppt [COMPATIBILITY MODE]<br>■/■ A4  🖨 1 | 05/12<br>16:38:55 | 12 | ×1 | Alice |

SELECTED NUMBER: 2   ☐ SELECT ALL
TOTAL NUMBER: 2        (UP TO 100 JOBS)

PRINT SETTING ▲ | DISPLAY IMAGE | DELETE JOB | STOP PRINTING ▲ | START PRINTING 501
502

RELEASING IPP STORED JOB

PLEASE SELECT JOB.

SAME GROUP ▼

| ✓ | JOB NAME/PRINT SETTING | DAY AND TIME ▼ | NUMBER OF PAGES × NUMBER OF COPIES | ESTIMATED TIME / USER NAME |
|---|---|---|---|---|
| ☐ | 1200J10.xls ▬/▬ A4 | 05/12 16:38:40 | 5 ×1 | Alice |
| ☐ | NEW TEXT.txt ▬/▬ A4 | 05/12 17:00:12 | 2 ×1 | Bob |

521

PROOF PRINT AND SUSPEND  523

PRINT  522

FIG.9A

```
CAPABILITY INQUIRY REQUEST PACKET
Version : 2.0
Operation : Get-Printer-Attributes
Request-ID : 1

Operation-attributes-tag :
 · Requested-attributes :
operations-supported
color-supported
copies-supported
sides-supported
job-storage-supported
job-storage-access-supported
job-storage-group-supported
```

FIG.9B

```
CAPABILITY RESPONSE PACKET
Version : 2.0
Status-code : successful
Request-ID : 1

Operation-attributes-tag :
 · Printer-attributes-tag
operations-supported : "create-job", "send-document", "cancel-job", "Get-Printer-attributes", "Get-Job-attributes", "hold-job"
color-supported : true
copies-supported : 1 - 9999
sides-supported : "one-sided", "two-sided-short-edge"
job-storage-supported : "any"
```

FIG.9C

```
CAPABILITY RESPONSE PACKET (IN A CASE WHERE STORAGE JOB IS NOT SUPPORTED)
Version : 2.0
Status-code : successful
Request-ID : 1

Operation-attributes-tag:
 · Printer-attributes-tag
operations-supported : "create-job" , "send-document" , "cancel-job" , "Get-Printer-attributes" , "Get-Job-attributes"
color-supported : true
copies-supported : 1 - 9999
sides-supported : "one-sided" , "two-sided-short-edge"
```

FIG.9D

```
PRINT REQUEST PACKET
Version : 2.0
Operation : Hold-Job
Request-ID : 2

Operation-attributes-tag :
requesting-user-name : alice
job-name : test.pdf
job-storage-disposition : store-only Job-attributes-tag :
print-color-mode : monochrome
copies : 1
sides : two-sided-short-edge
```

FIG.10A

CAPABILITY RESPONSE PACKET

Version : 2.0
Status-code : successful
Request-ID : 1

Operation-attributes-tag :
· Printer-attributes-tag
operations-supported : "create-job" , "send-document" , "cancel-job" , "Get-Printer-attributes" , "Get-Job-attributes" , "hold-job"
color-supported : true
copies-supported : 1 - 9999
sides-supported : "one-sided" , "two-sided-short-edge"
cn-job-storage-destination-supported : "Box Space" , "Retention Space" , "IPP HoldJob Space" ~1001

FIG.10B

PRINT REQUEST PACKET

Version : 2.0
Operation : Hold-Job
Request-ID : 2

Operation-attributes-tag :
requesting-user-name : alice
job-name : test.pdf
job-storage-disposition : store-only Job-attributes-tag :
print-color-mode : monochrome
copies : 1
sides : two-sided-short-edge
cn-job-storage-destination : "Box Space" ~1002

IMAGE PROCESSING APPARATUS, CONTROL METHOD FOR THE IMAGE PROCESSING APPARATUS, AND STORAGE MEDIUM FOR RECEIVING A PRINT JOB

BACKGROUND

Field of the Disclosure

The present disclosure relates to an image processing apparatus that receives a print job from the outside.

Description of the Related Art

It is common to input a print job from a client terminal to an image processing apparatus and store the print job in a storage of the image processing apparatus without discharging paper (Japanese Patent Application Laid-Open No. 2010-253724). In such a print system, a user selects storing of a print job and instructs printing using a vender driver of the image processing apparatus from the client terminal. After the print job is stored in the image processing apparatus based on the instruction, the user moves to the image processing apparatus. The user then selects the print job stored in the image processing apparatus from an operation unit of the image processing apparatus to perform print processing.

In contrast, specifications for storing a print job according to standard printing specifications without using a vendor driver are specified in Request For Comments (RFC) 8011 and the Printer Working Group (PWG). Internet Printing Protocol (IPP) Enterprise Printing Extensions v2.0 published by the PWG as a prototype [searched on Nov. 10, 2021] (https://ftp.pwg.org/pub/pwg/ipp/wd/wd-ippepx20-20210423-rev.pdf) specifies a Job Storage function as an IPP printing extension. The function is to store a print job input from a print client in an image processing apparatus and issue an instruction to release the print job later.

An image processing apparatus may provide a plurality of different storage functions. In such an image processing apparatus, a user who uses the image processing apparatus appropriately designates an arbitrary storage function via a setting screen of a vender driver provided by the vendor of the image processing apparatus and uses the storage function properly.

If a print job storage function in the standard specifications such as the IPP is simply implemented in the image processing apparatus, it is considered that a new job storage function, such as a Job Storage function, will be added in addition to an existing vendor-specific job storage function.

It is assumed that a tendency of usage of an image processing apparatus and a storage function will vary depending on an organization or a company where the image processing apparatus is installed. In other words, it can be assumed that the storage function mainly used is different depending on an installation environment of the organization, the company, or the like.

If a print job in a driverless printing framework based on the standard specifications, such as the IPP, can be stored with respect to the storage function that is frequently used on a daily basis in the installation environment as described above, there is a possibility that user convenience can be improved.

However, in the driverless printing framework based on the standard specifications, such as the IPP, a print setting for storing a job is specified, but an operation specifying a storage area or a storage function for storing the job is not specified. Thus, there is an issue that, in a case where driverless printing based on the standard specifications is performed, it may not be possible to perform flexible control, such as storing a print job for a specific storage function.

SUMMARY

The present disclosure is made in view of the above-described issues. An aspect of the present disclosure is directed to a technique capable of setting, in a case where a print job based on standard specifications, such as the Internet Printing Protocol (IPP), is stored, which storage function of an image processing apparatus the print job is associated with and stored. Another aspect of the present disclosure is directed to improvement of user convenience in storing a print job based on the standard specifications, such as the IPP.

Embodiments of the present disclosure include an image processing apparatus configured to manage data corresponding to a print job received from an outside, the image processing apparatus having a plurality of output management functions including at least a first output management function and a second output management function different from the first output management function as output management functions of outputting the managed data in accordance with an operation performed by a user. The image processing apparatus includes a setting unit configured to set which output management function of the plurality of output management functions handles a print job that satisfies a predetermined condition based on a user operation, and a control unit configured to, in a case where a print job that satisfies the predetermined condition is received, perform control such that data corresponding to the received print job is managed in association with the output management function set by the setting unit.

Further features of the present disclosure will become apparent from the following description of exemplary embodiments with reference to the attached drawings.

BRIEF DESCRIPTION OF THE DRAWINGS

FIGS. 5A to 5C illustrate examples of screens displayed on the operation unit of the MFP.

FIGS. 9A to 9D illustrate examples of packets communicated between the MFP and the client terminal.

FIGS. 10A and 10B illustrate examples of packets according to a second exemplary embodiment.

DESCRIPTION OF THE EMBODIMENTS

Exemplary embodiments of the present disclosure will be described below with reference to the attached drawings. The exemplary embodiments described below do not restrict the present disclosure, and all of combinations of the features described in the exemplary embodiments are not always essential to the means for solution according to the present disclosure.

Figure 1:
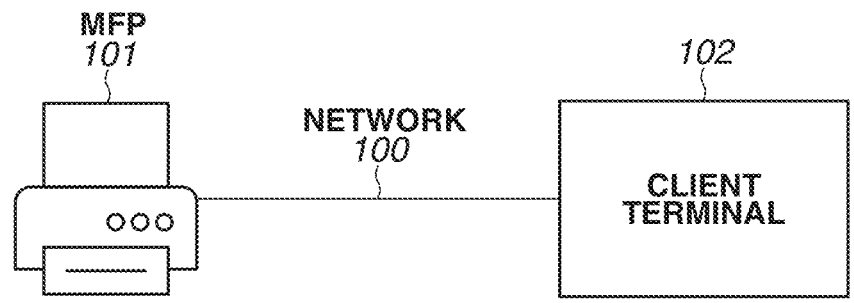
FIG. 1 illustrates an example of an image processing system.

A configuration of an image processing system according to embodiments of the present disclosure is described with reference to FIG. 1. The image processing system according to a first exemplary embodiment includes a multi-function peripheral (MFP) 101 and a client terminal 102. The MFP 101 communicates with the client terminal 102 via a network 100.

The MFP 101 has a scanning function, a printing function, and a copying function. The scanning function is a function of transmitting data based on an image obtained by reading a document using a reading unit to the outside. The printing function is a function of printing an image on a sheet of paper or the like based on a print job received from an external apparatus. According to the present exemplary embodiment, the MFP having a plurality of functions is described as an example of an image processing apparatus, but the present disclosure is not limited to this configuration. For example, the present disclosure can also be applied to a single function peripheral (SFP) having only a printing function.

The MFP 101 according to the present exemplary embodiment further has a storage function (also referred to as an output management function) of storing, managing, and outputting data, such as a print job. The MFP 101 stores a print job in its own storage area and, in response to receiving a user operation to select and print the stored print job, performs print processing based on the selected job.

The client terminal 102 has a function of transmitting a print job to the MFP 101. The client terminal 102 includes a print client application. The print client application generates a print job conforming to an Internet Printing Protocol (IPP) and transmits the print job to an image processing apparatus conforming to the IPP or others. According to the present exemplary embodiment, a case where the print client application generates a print job conforming to the IPP is described as an example, but the present disclosure is not limited to this case. Embodiments of the present disclosure may include a print application that generates an IPP-based print job that is based on the IPP and partially customized, in other words, a print job according to the IPP. Hereinafter, the print client application is also simply referred to as the print client. For example, in a case where an operation system (OS) of the client terminal 102 is Windows® 10 or Windows® 11, an IPP class driver conforming to Mopria® is preinstalled therein. Further, for example, in a case where the OS of the client terminal 102 is MacOS®, iOS®, or iPad® OS, a print client conforming to AirPrint® is preinstalled therein.

According to the present exemplary embodiment, it is assumed that the above-described print client application supports the above-described IPP Job Storage function, and the MFP 101 also supports the Job Storage function.

The MFP 101 according to the present exemplary embodiment also provides a plurality of different storage functions that is different from the Job Storage function. The different storage functions are the ones of storing a print job specified to be stored from a vendor driver provided by the vendor and data obtained by the MFP 101 reading a document so that they can be printed at any time. A user who wants to use the storage function can appropriately designate an arbitrary storage function via a setting screen of the vender driver provided by the vender of the MFP 101 and use the storage function properly.

To simply incorporate the Job Storage function into the MFP 101 can be considered to implement a new module or a new application for supporting the Job Storage function in addition to an existing job storage function.

It is assumed that a tendency of usage of an image processing apparatus and a storage function will be different depending on an organization and a company where the image processing apparatus is installed. In other words, it can be assumed that the storage function mainly used is different depending on an installation environment of the organization, the company, or the like.

As described above, there is a possibility that user convenience can be improved if a print job in a driverless printing framework based on the standard specifications, such as the IPP, can be stored with respect to the storage function frequently used on a daily basis in the installation environment.

However, in the driverless printing framework based on the standard specifications, such as the IPP, a print setting or the like for storing a job is specified, but an operation explicitly specifying a storage area and a storage function for storing the job is not specified. Thus, in a case where driverless printing based on the standard specifications is performed, it is difficult to perform flexible control, such as storing a print job for a specific storage function.

According to the present exemplary embodiment, it is possible to set which storage function of the image processing apparatus the print job is associated with and stored, in view of the above-described issues. Further, the present exemplary embodiment provides a mechanism that switches a storage destination depending on a setting in a case of storing a print job based on the standard specifications, such as the IPP. The present exemplary embodiment is described in detail below.

<Hardware Configuration of MFP>

Figure 2:
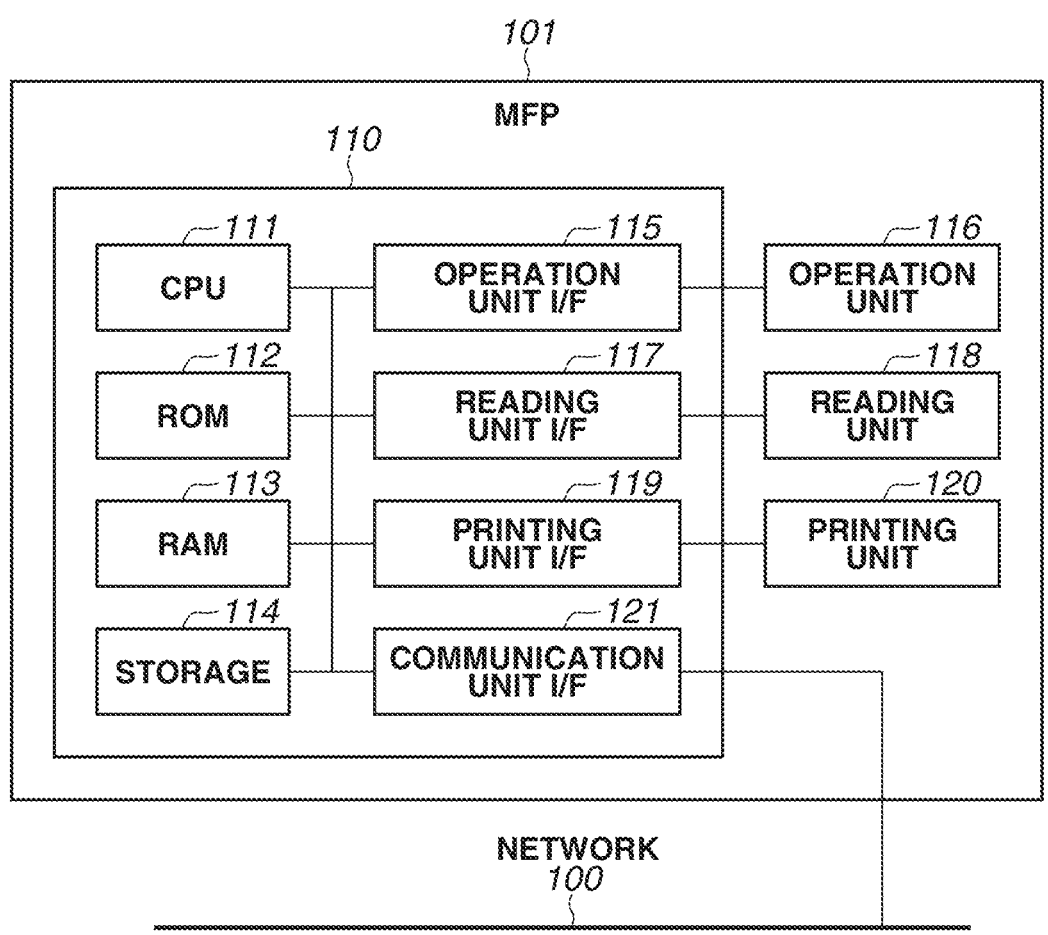
FIG. 2 illustrates an example of a hardware configuration of a multi-function peripheral (MFP).

A configuration of the MFP 101 is described. FIG. 2 is a block diagram illustrating a hardware configuration of the MFP 101.

A control unit 110 including a central processing unit (CPU) 111 controls an overall operation of the MFP 101. The CPU 111 reads a control program stored in a read only memory (ROM) 112 or a storage 114 and performs various types of control, such as print control and read control. The ROM 112 stores a control program executable by the CPU 111. A random access memory (RAM) 113 is a main memory of the CPU 111 and is used as a work area or a temporary storage area for developing various control programs. The storage 114 stores print data, image data, various programs, and various types of setting information. According to the present exemplary embodiment, an auxiliary storage device, such as a solid state drive (SSD), is assumed as the storage 114, but a nonvolatile memory, such as a hard disk drive (HDD), may be used instead of the SSD. As described above, the hardware, such as the CPU 111, the ROM 112, and the RAM 113, forms a computer.

In the MFP 101 according to the present exemplary embodiment, one CPU 111 uses one memory (e.g., the RAM 113) to execute each processing illustrated in flowcharts described below, but other modes may also be used. For example, a plurality of CPUs, RAMs, ROMs, and storages can cooperate together to execute each processing illustrated in the flowcharts described below. Further, a part of the processing may be executed using a hardware circuit.

An operation unit interface (I/F) 115 connects an operation unit 116 and the control unit 110.

The operation unit 116 includes a liquid crystal display unit having a touch panel function, and various hardware keys. The operation unit 116 functions as a display unit to display information and a reception unit to receive an instruction from a user.

A reading unit I/F 117 connects a reading unit 118 and the control unit 110. The reading unit 118 reads a document placed on a document platen or an automatic document feeder (ADF) and generates a read image. The generated read image is stored in the storage 114 or the RAM 113. The read image generated by the reading unit 118 is transmitted to the external apparatus via the network 100 or used to be printed on a sheet.

A printing unit I/F 119 connects a printing unit 120 and the control unit 110. The read image generated by the reading unit 118 and stored in the storage 114 or the RAM 113 is transferred from the control unit 110 to the printing unit 120 via the printing unit I/F 119. The printing unit 120 receives the read image via the control unit 110 and prints the read image on a sheet. Further, the printing unit 120 also performs print processing based on a print job received from the external apparatus and print processing based on data managed by the storage function. A printing method of the printing unit 120 may be an electrophotographic method or an inkjet method. Another printing method, such as a thermal transfer method, can also be applied to the printing unit 120.

A communication unit I/F 121 is a communication interface included in the MFP 101. The control unit 110 is connected to the network 100 via the communication unit I/F 121. The communication unit I/F 121 can transmit data to a device or a server on the network 100, or to a server on the Internet via a gateway (not illustrated).

According to the present exemplary embodiment, it is assumed that the communication unit I/F 121 is a communication interface that performs wired communication conforming to Ethernet®, but is not limited to this one.

For example, the communication unit I/F 121 may be a wireless communication interface conforming to the Institute of Electrical and Electronics Engineers (IEEE) 802.11 series. The communication interface may also be the one that connects to a cellular network (e.g., Long Term Evolution (LTE) and the fifth generation mobile communication system (5G)).

<Print Sequence>

A print sequence according to the present exemplary embodiment is described with reference to FIG. 3.

A user firstly uses the print client of the client terminal 102 to add a printer to the MFP 101 for printing. An operation for adding a printer is slightly different depending on the OS, but a printer can be added by performing a printer search and selecting a printer from the search result.

The client terminal 102 firstly searches for a printer, such as the MFP, that exists on the connected network and displays a list of found printers. The client terminal 102 then adds the printer selected by a user from the list to an output destination printer of the print client (step S301). The print client having detected the selection operation generates a printer object including a spooler area for transmitting a print job to the printer.

Here, it is described that the MFP 101 is selected and added as the output destination printer of the print client.

In step S302, the print client inquires of the MFP 101 about a printing capability. A content of the inquiry is described with reference to FIGS. 9A to 9D. FIGS. 9A to 9D are examples of IPP packets to be communicated between the MFP 101 and the client terminal 102. FIG. 9A illustrates an example of a capability request to be transmitted from the print client to the printer. Attribute information "Job-Storage-Supported", "Job-Storage-Access-Supported", and "Job-Storage-Group-Supported" are inquiries about a job storage function. In other words, these are the attribute information for inquiring what function of the job storage function is supported. In addition, the inquiry includes attribute information for inquiring whether general capabilities are supported, such as whether color printing is supported, and whether double-sided printing is supported.

In step S303, the MFP 101 having received the inquiry request for the printing capability illustrated in FIG. 9A generates a response packet illustrated in FIG. 9B and transmits the response packet to the client terminal 102.

In a case where the MFP 101 has the storage function for a print job, the MFP 101 generates the response by including a character string "Hold-Job" in attribute information "Operations-supported". The character string "Hold-Job" indicates that the MFP 101 supports a Hold-Job operation.

The MFP 101 also responds with information about a capability of the job storage function. In FIG. 9B, a character string "any" is responded as the attribute information "Job-Storage-Supported". The character string "any" indicates that the stored job can be operated even if a job storage method is not particularly specified.

The attribute information indicates that the Job-Storage function is supported, that is, the MFP 101 supports the IPP job storage function. According to the present exemplary embodiment, a response such as the character string "any" is illustrated as an example, but the content is not limited to this example. The response can be configured to specifically list supporting capabilities.

Meanwhile, in a case where an operation setting that disables the IPP Job Storage function is set as described below, the MFP 101 transmits a response that does not include the attribute information related to the Hold-Job attribute and the Job-Storage function as illustrated in FIG. 9C.

Figure 8:
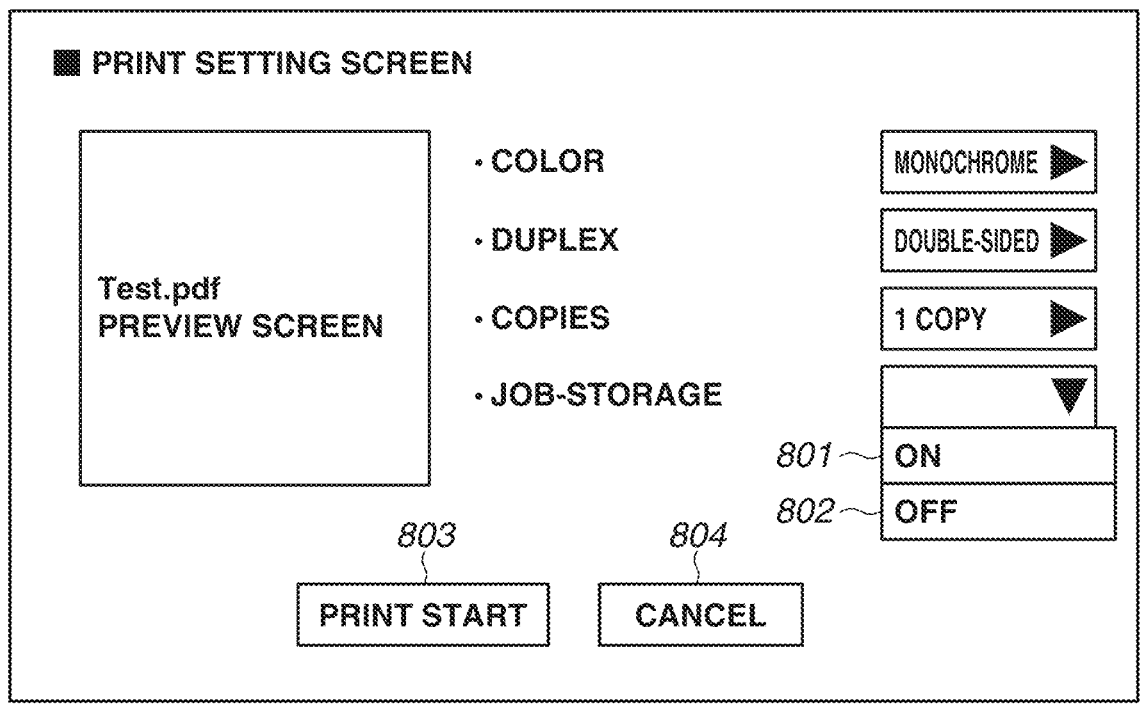
FIG. 8 illustrates an example of a screen displayed on a client terminal.

Having received the capability response from the MFP 101, the print client updates capability information of the output destination printer that has been added in step S301 based on the attribute information included in the capability response. In step S304, the print client displays a print setting screen illustrated in FIG. 8 in response to reception of a user operation to call the print setting screen. The print setting screen is generated based on the updated capability information. The user can select either "monochrome" or "color" by selecting a Color item. The user can select double-sided printing or one-sided printing from a Duplex item. The user can also input the number of copies by operating a Copies item. Finally, the user can set whether to use the Job-Storage function, in other words, whether to enable a job storage setting based on the Job-Storage function through an operation of a Job-Storage item. The print client changes the job storage setting to ON upon detecting that an option 801 is selected from a pull-down list and changes the job storage setting to OFF upon detecting that an option 802 is selected.

The user can appropriately change the print setting by performing an operation on each item. A print start key 803 is used to execute printing. A cancel key 804 is used to cancel printing.

Figure 3:
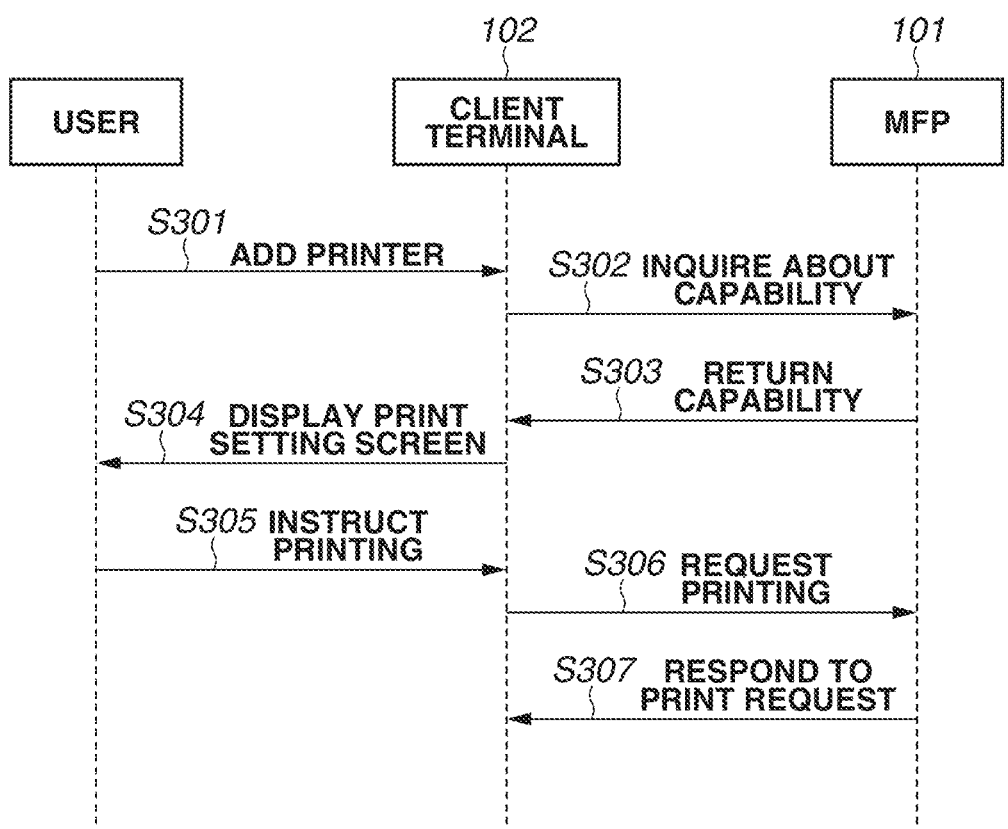
FIG. 3 is a sequence diagram illustrating a printing procedure.

Returning to the description of FIG. 3, in step S305, the print client detects that a print instruction is issued. Specifically, the print client detects that the print start key 803 is pressed.

Upon detecting issuance of the print instruction, in step S306, the print client generates a print job based on the specified print setting and transmits a print request for the generated print job to the MFP 101.

FIG. 9D illustrates an example of a print job packet to be transmitted by the print client to the MFP 101 in step S306. Here, FIG. 9D illustrates an example of a print job generated by the print client in a case where the option 801 is selected and the job storage setting is changed to ON for the sake of description. In the print job, a Hold-Job operation attribute indicating that temporary storage is performed is specified. Further, information (Alice) for identifying a user who requests other print settings or print job, and information indicating a name of the job (test.pdf) are listed in the print job packet. According to the present exemplary embodiment, a case is illustrated as an example in which the print client transmits a print job specifying a Store-Only attribute that does not execute printing but only storing at the time of inputting a job.

Upon receiving the print job, the MFP 101 performs processing for printing the print job in the flowcharts described below and processing for storing data based on the print job in association with the storage function, based on the attribute information of the operation and the attribute information of the job that are specified in the print job. The CPU 111 of the MFP 101 that has received the print job performs processing based on the operation and the attribute specified in the print job. The CPU 111 then transmits a processing success response to the client terminal 102 after completing the processing. In step S307, the MFP 101 transmits a success response in a case where printing or storing is successful or a failure response in a case where printing or storing fails.

As described above, the MFP 101 can receive a print job from the IPP print client and perform print processing and job storing processing.

<Plurality of Storage Functions>

Figure 4A:
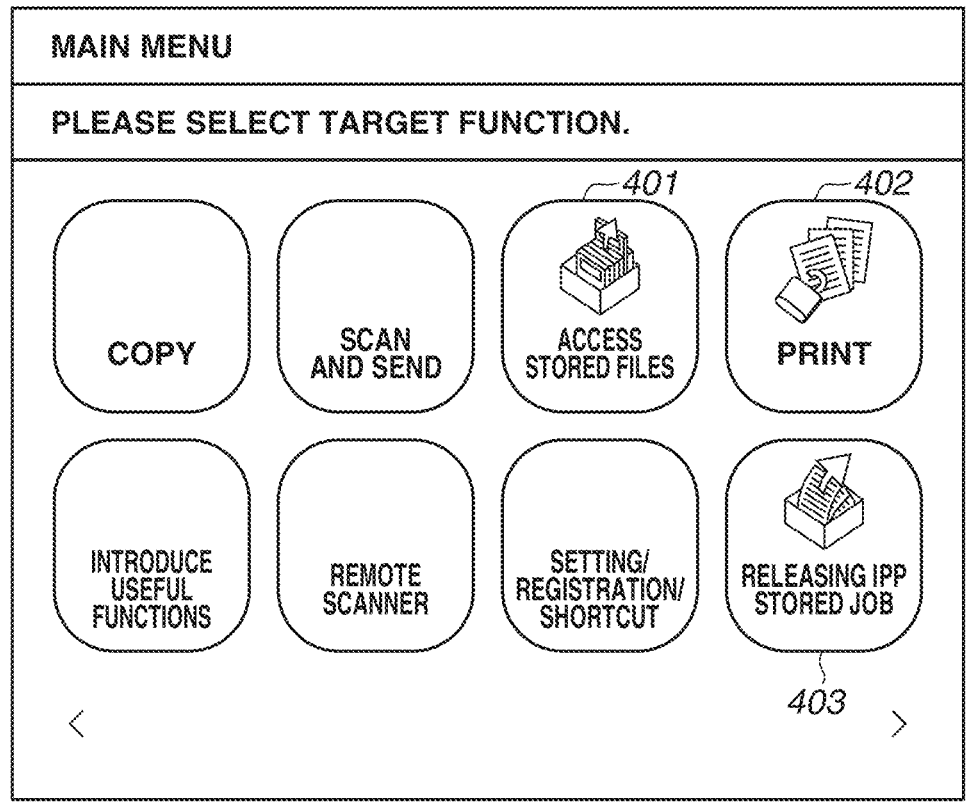
FIGS. 4A and 4B illustrate examples of screens displayed on an operation unit of the MFP.
Figure 4B:
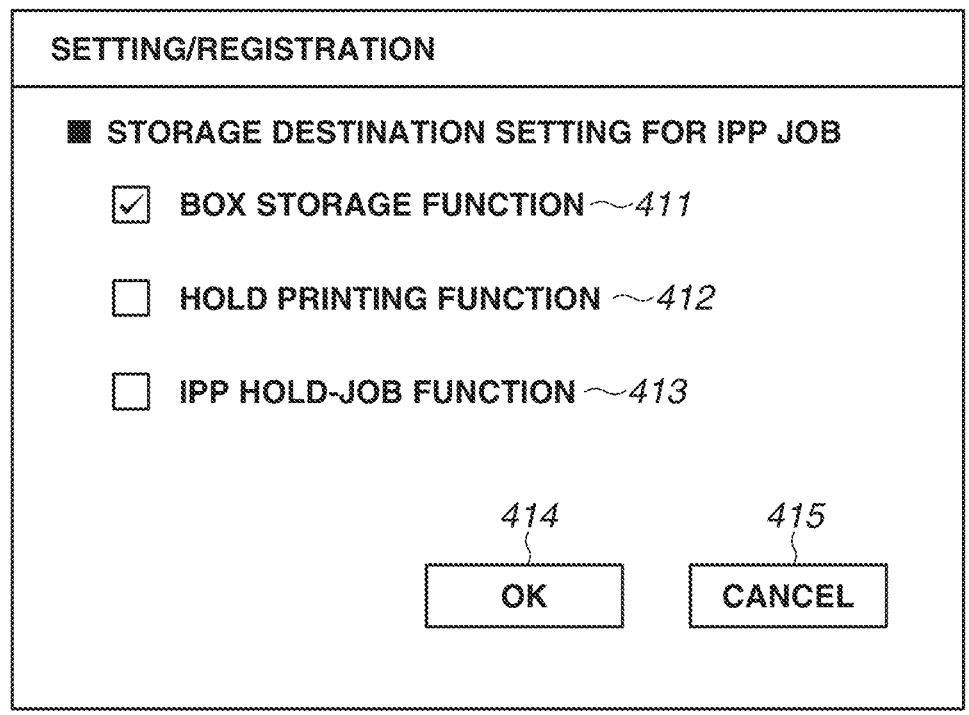
Figure 5B:
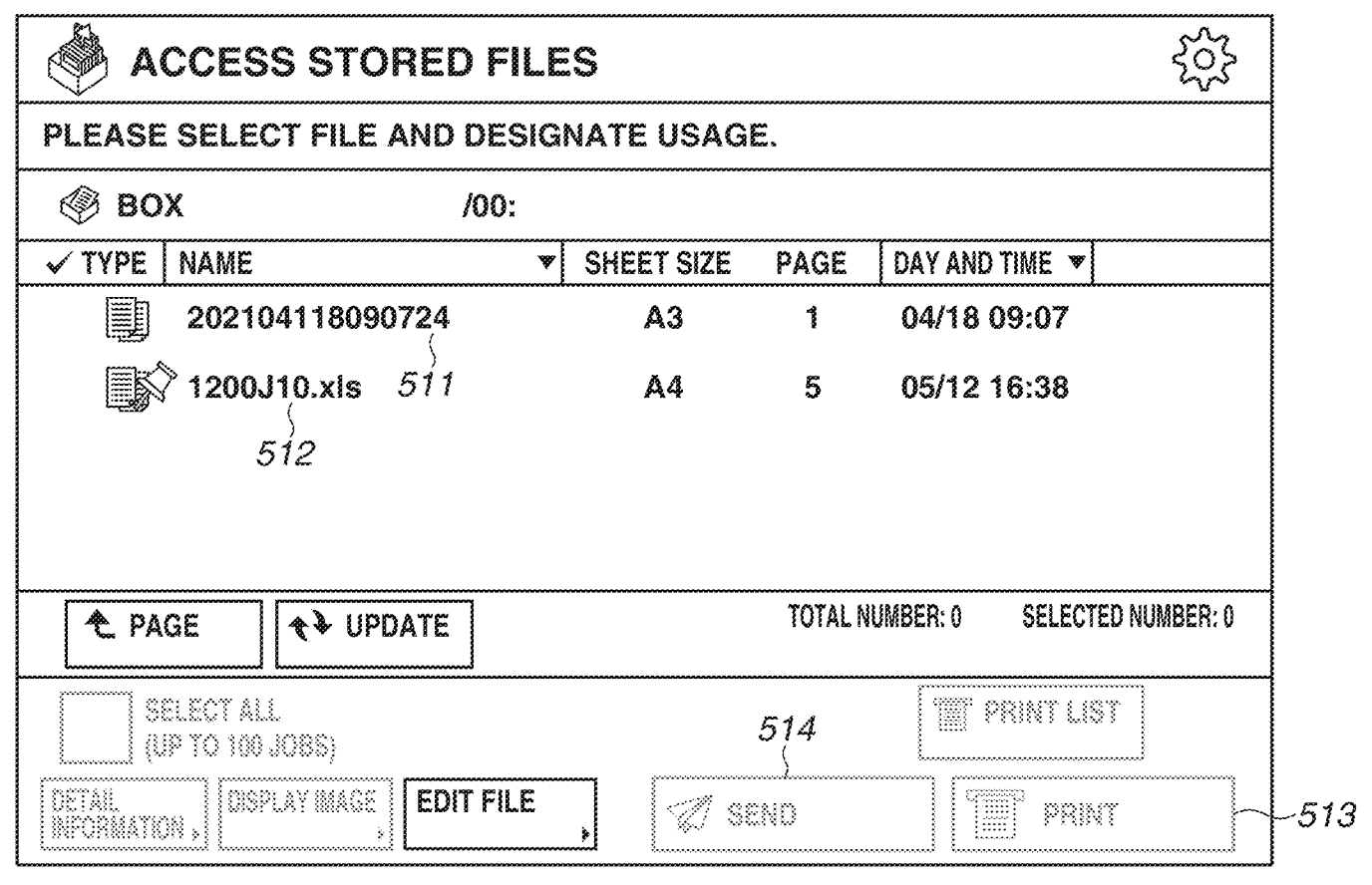

As described above, the MFP 101 according to the present exemplary embodiment has a plurality of storage functions. The plurality of storage functions is specifically described with reference to FIGS. 4A, 4B and 5A to 5C. FIG. 4A illustrates an example of a main menu displayed on the operation unit 116 of the MFP 101, and FIG. 4B illustrates an example of an operation setting screen related to the IPP Job-Storage function. FIGS. 5A to 5C are examples of output data selection screens provided by the storage functions.

FIG. 4A illustrates an example of a main menu screen to be displayed after a user of the MFP 101 logs into the MFP 101. The user can select a desired function via the main menu screen, and use, for example, a copy function and a scan and send function provided by the MFP 101. The MFP 101 according to the present exemplary embodiment has three storage functions. The first storage function is a box storage function corresponding to an icon 401. The box storage function is an example of a first output management function. The second storage function is a hold printing function corresponding to an icon 402. The hold printing function is an example of a second output management function.

The third storage function is an IPP Hold-Job function corresponding to an icon 403. The IPP Hold-Job function is an example of a third output management function. Each icon includes an icon image that matches a characteristic of the storage function and a function name.

Each storage function has different characteristics, and the storage function mainly used is different depending on the installation environment of the organization, the company, or the like. The characteristics of the storage functions will now be briefly described. The box storage function indicated by the icon 401 is a function of converting a print job received from a printer driver or the like into a format suitable for printing and storing the format in a storage area that handles a unique file format suitable for printing. In a case where the print job is stored in the storage area, the MFP 101 stores a file obtained by converting page description language (PDL) data, such as a Portable Document Format (PDF) and a page control language (PCL), included in the print job into a bitmap format in association with the print setting.

The storage area of the box storage function can also store a file in the bitmap format obtained by reading a paper document with the reading unit 118. The file stored by the box storage function can be printed or externally transmitted via the output data selection screen of the box storage function illustrated in FIG. 5B. FIG. 5B illustrates an example of a screen in a state where a file corresponding to a read image of a paper document read by the reading unit 118 and a file corresponding to a print job received from the driver are stored. Information 511 relates to the file corresponding to the read image. Information 512 relates to the file corresponding to the print job input from the printer driver. The information 512 includes an icon indicating a pinning mark. The icon is displayed to inform a user visually that the print job is stored.

The user can select the file as an output target by selecting an area corresponding to the information 511 or 512. Keys 513 and 514 are used to select an output method. In the box storage function, two patterns of output processing can be performed, that is output by printing and output by transmission. If the MFP 101 detects that the key 513 is pressed after selection of the file, the MFP 101 performs print processing of the selected file.

The data stored by the box storage function can be referred to, printed, and externally transmitted as appropriate by anyone other than the user who has transmitted the print job to the storage area of the box storage function. Thus, the box storage function is mainly used as the storage function in an installation environment where tasks are often performed to store and reuse a template document to be used by a plurality of persons. As described above, a file stored by the box storage function can be output by any user who can use the MFP 101, which is highly convenient, but the box storage function has a characteristic that it is not suitable for storing a document with a high security level.

Returning to the description of FIGS. 4A and 4B, the hold printing function is described. The hold printing function denoted by the icon 402 is a function of, in a case where a document is printed from the printer driver mainly provided by the vendor, temporarily holding in the MFP 101 a print job for printing the document so as not to be immediately printed. The hold printing function according to the present exemplary embodiment is configured such that the print job held by the hold printing function cannot be printed unless the user is confirmed as a person who has transmitted the print job with the MFP 101. A printing method for printing a print job held by the hold printing function is described. A user performs a user operation to select the icon 402 from the main menu screen illustrated in FIG. 4A after logging into the MFP 101. If the user operation to select the icon 402 is detected, the MFP 101 displays a print job selection screen of the hold printing function. FIG. 5A illustrates an example of the print job selection screen of the hold printing function.

The MFP 101 identifies the user logged into the MFP 101, extracts the print job corresponding to the user, and displays only the print job corresponding to the extracted logged-in user in a list format as illustrated in information 501 in FIG. 5A. The user selects the desired print job from the print job selection screen and issues a print instruction. After the print job as a printing target is selected based on the user operation, the MFP 101 that receives the user operation to select a print start key 502 executes printing based on the selected print job.

As described above, using the hold printing function can prevent an important document from being seen by others or taken away by mistake compared with a case where printing is performed based on the print job every time the print job is received. According to the present exemplary embodiment, an icon in which a picture symbolizing a key is combined with a picture symbolizing a document bundle associated with a print job is displayed as an icon for the hold printing function, based on the above-described feature.

The main usage of the hold printing function is described. A security-conscious organization mainly uses the hold printing function as the storage function. Further, as a setting of the hold printing function, there are some organizations that force all users to set forced hold printing for temporarily storing a print job using the hold printing function with respect to various print jobs input to the MFP and to hold the print job by the hold printing function. In such installation environments as described above, the hold printing function is mainly used.

Returning to the description of FIGS. 4A and 4B, the IPP Hold-Job function is described. The IPP Hold-Job function denoted by the icon 403 is a storage function of handling only a print job related to the IPP Job-Storage function. In a case where the "IPP Hold-Job function" is set as a storage destination via a storage destination setting screen described below, the print job is stored in the storage area provided for the IPP Hold-Job function. Printing of the print job stored in the storage area for the Hold-Job function is described. A user selects the icon 403 from the main menu illustrated in FIG. 4A. If the user operation to select the icon 403 is detected, the MFP 101 displays the print job selection screen of the IPP Hold-Job function illustrated in FIG. 5C. At this time, the MFP 101 extracts the print job stored in the storage area for the Hold-Job function and displays the print job on the screen in a list format illustrated in information 521. FIG. 5C illustrates the selection screen that is displayed in a case where "Alice" logs into the MFP 101. "Alice" and "Bob" belong to the same department. According to the present exemplary embodiment, the MFP 101 performs control to extract a job of a user who belongs to the same department as the logged-in user, from the print jobs stored in the storage area for the Hold-Job function and to display the job.

The user can perform printing by selecting the desired print job from the selection screen and pressing a print key 522. The user can also issue a print instruction specific to the IPP Job-Storage function or a Job-Release function, such as a proof print function defined by the IPP, on the selection screen. The proof print function is a proofread print function.

The user can execute printing based on the proof print function by pressing a key 523 after selecting a file. In a case where the proof print function is selected, the MFP 101 prints one copy of test printing. After printing of one copy is completed, the MFP 101 suspends printing and displays an inquiry screen. The inquiry screen, which is not illustrated, is a screen that can receive an operation to execute main printing or an operation to cancel the job, in a state where the printing is suspended. Upon detecting that an operation to execute main printing is performed, the MFP 101 outputs the specified number of printed materials.

Usage of the IPP Hold-Job function is described. For example, in a case of an organization that mainly uses driverless printing based on the standard specifications such as the IPP standard, it is unfamiliar with the storage functions for conventional printer drivers, such as the hold printing function and the box storage function, and is not conscious of using the hold printing function and the box storage function. Thus, it is assumed that a user in the organization that mainly uses the driverless printing wants to use the storage function dedicated to a purpose of printing the IPP storage job. There is also an advantage that the user can reach the storage function screen by selecting the icon 403 having a name or the like that clearly indicates that the IPP storage job is to be printed. The icon 403 is described. The icon 403 is configured with a combination of a function name, a picture, and a picture of an arrow. The function name indicates that an IPP job is to be released, the picture reminiscent of holding a document bundle associated with the print job, and the picture of an arrow suggests that the document bundle in the held state can be output and used.

According to the present exemplary embodiment, it is assumed that a file and data for each storage function are stored in physically different storage areas, but it is not limited to this configuration. The file and data of each storage function can be stored in the same physical storage area (e.g., the same partition). In this case, the MFP 101 manages the file and data stored in the storage area in association with identification information that identifies which storage function handles the data. In a case where an operation to select the storage function is received from a user, the MFP 101 extracts the data and file associated with the identification information that matches the storage function selected by the user. The MFP 101 displays the selection screen for each storage function based on the extracted data and file.

<Storage Setting of Storage Job>

Control to set which storage function of the image processing apparatus described above is associated with the print job specified to be stored by the IPP and is stored will be described with reference to FIG. 4B. FIG. 4B illustrates an example of a screen to be displayed in a case where a user who has administrator authority logs into the MFP 101 and performs an operation to display a setting change screen related to an IPP job. FIG. 4B illustrates a case where the box storage function is set as a storage destination as an example. The user can select display items 411 to 413 and set one of the storage functions as the storage destination for a job specified to be stored in the IPP job. Any of the display items 411 to 413 can also be changed to a non-selected state. An OK key 414 is used to determine a setting change, and a cancel key 415 is used to cancel the setting change.

Upon detecting that the OK key 414 is pressed, the MFP 101 changes an operation setting based on a setting state (a selected state) set via the screen in FIG. 4B. Specifically, the MFP 101 changes the operation setting that indicates an IPP job storage destination and the operation setting that indicates whether to enable the IPP Job-Storage function. If any of the storage functions is selected, the storage function in the selected state is stored in the storage 114 as the operation setting indicating the IPP job storage destination. In this case, the operation setting of the IPP Job-Storage function stored in the storage 114 is changed to be enabled. If none of the storage functions are selected, the operation setting indicating the IPP job storage destination stored by the storage 114 is changed to a setting such as "NULL" or "none". In this case, the operation setting of the IPP Job-Storage function stored in the storage 114 is changed to be disabled.

Figure 6:
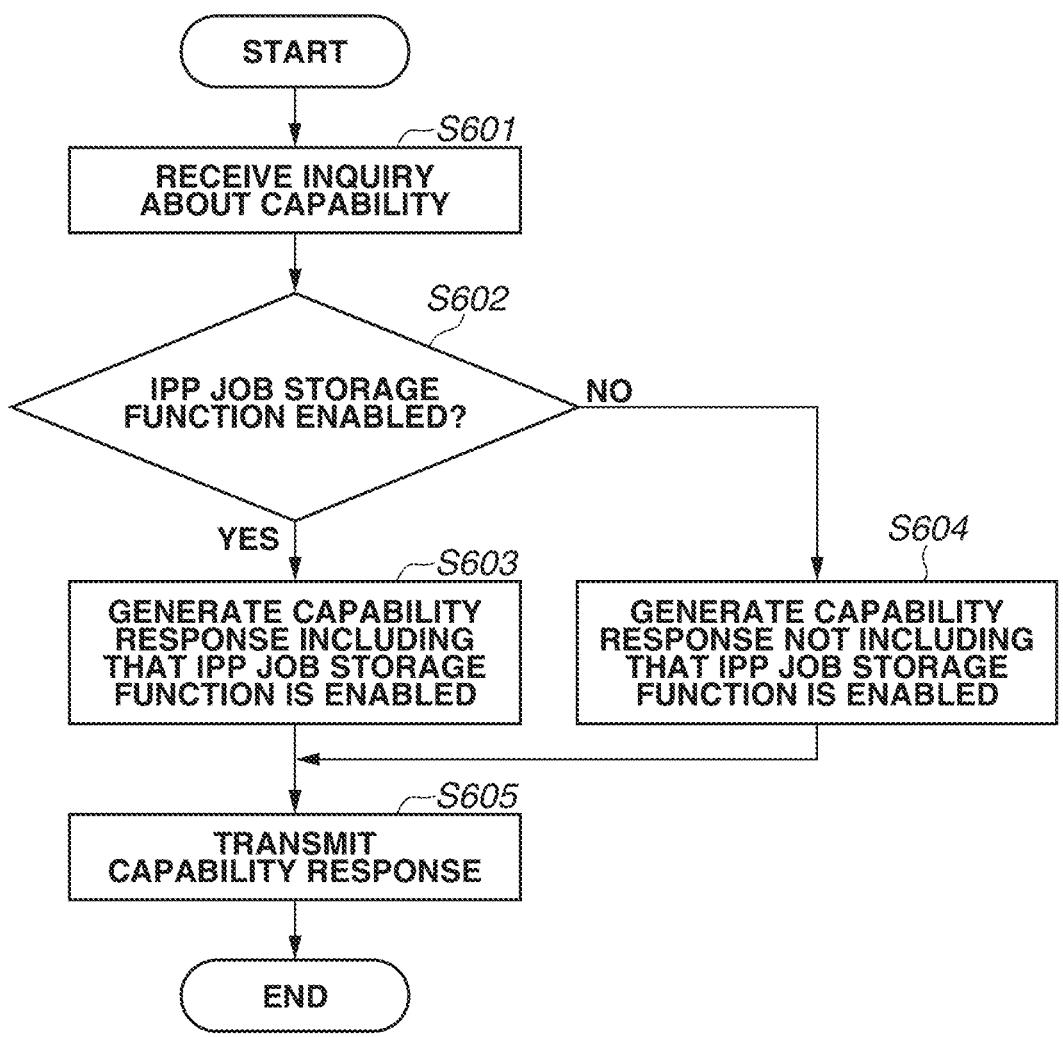
FIG. 6 is a flowchart illustrating an example of control executed by the MFP.
Figure 7:
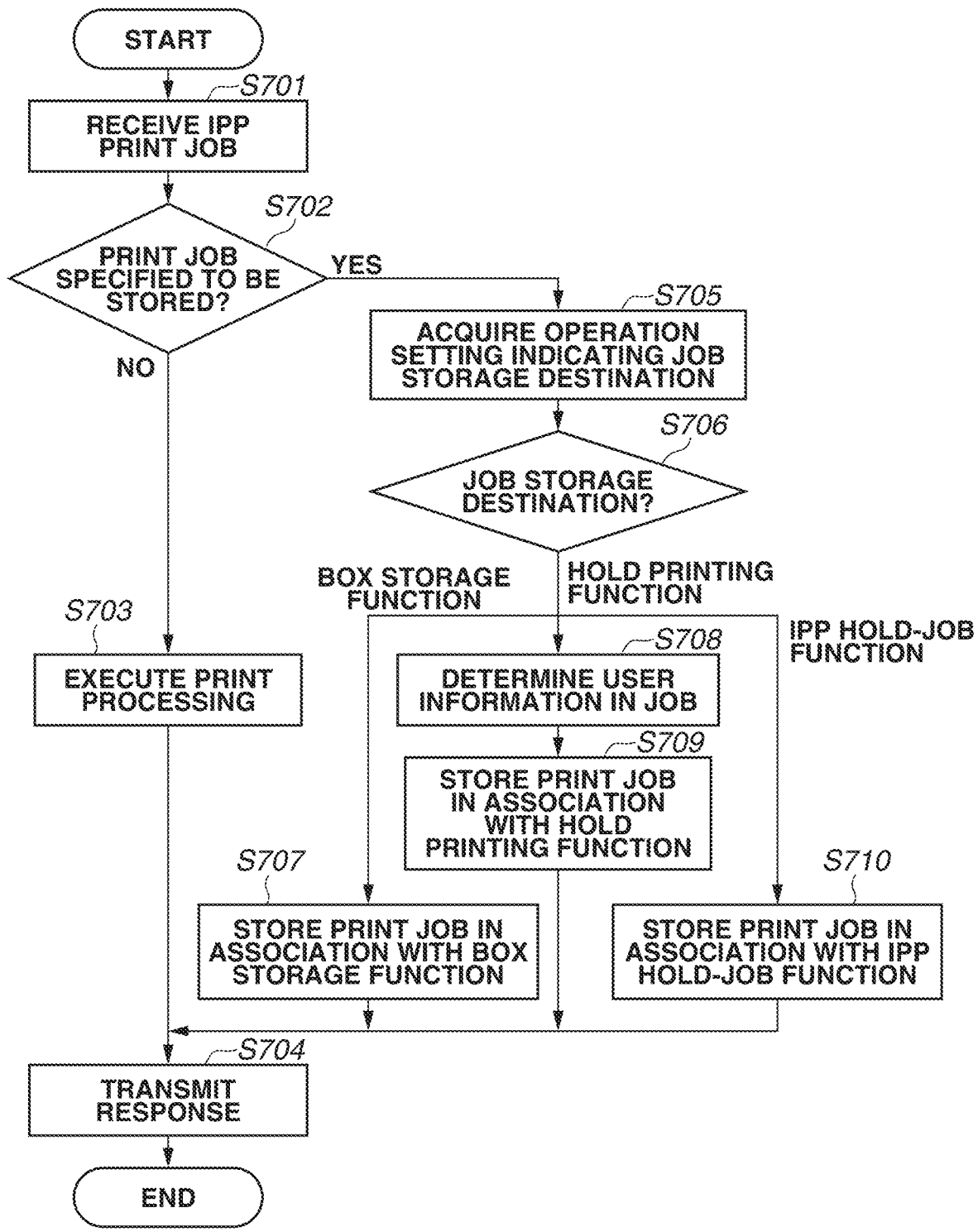
FIG. 7 is a flowchart illustrating an example of control executed by the MFP.

Next, the control of the MFP 101 based on the above-described operation setting is described with reference to the flowcharts in FIGS. 6 and 7. Each operation (step) illustrated in the flowcharts of FIGS. 6 and 7 is realized by the CPU 111 reading a program for realizing each control module stored in the ROM 112 or the storage 114 into the RAM 113 and executing it. A part of processing, such as transmission and reception, is realized by cooperation of the communication unit I/F 121 and the CPU 111.

The flowchart illustrated in FIG. 6 is an excerpt from the processing related to notification of capability information in the MFP 101.

In step S601, the CPU 111 receives a capability inquiry request packet from the external apparatus, such as the client terminal 102 (corresponding to step S302). The request received here is specifically a request for a "Get-Printer-Attributes Request" operation of the IPP illustrated in FIG. 9C.

In step S602, the CPU 111 determines whether the IPP job storage function is enabled.

The CPU 111 acquires the operation setting of the IPP Job-Storage function from the storage 114. In a case where "enabled" is set in the operation setting (YES in step S602), the processing proceeds to step S603. In a case where "enabled" is not set in the operation setting (NO in step S602), the processing proceeds to step S604.

In step S603, the CPU 111 generates a response content indicating that the IPP job storage function is supported. Specifically, the CPU 111 generates the response content including information indicating that the "Hold-Job" and the "Job-Storage" attribute illustrated in FIG. 9B are supported.

In step S604, the CPU 111 generates a response content indicating that the IPP job storage function is not supported. Specifically, the CPU 111 generates the response content that does not include the "Hold-Job" and the attribute related to the "Job-Storage" illustrated in FIG. 9C.

In step S605, the CPU 111 transmits the capability response packet generated in step S603 or S604 to the client terminal 102.

Next, IPP print job reception processing is described with reference to FIG. 7. FIG. 7 is the flowchart illustrating an excerpt of processing for receiving the IPP print job and processing after the reception in the MFP 101.

In step S701, the CPU 111 receives a print job according to the IPP from the client terminal 102. In step S702, the CPU 111 determines whether the print job is specified to be stored based on the attribute information included in the received print job. For example, in a case where the Hold-Job operation is specified in the operation specified in the job data, the CPU 111 determines that the print job is specified to be stored (YES in step S702) and the processing proceeds to step S705. In contrast, in a case where another print operation (e.g., a Print-Job operation and a Create-Job operation) is specified (NO in step S702), the processing proceeds to step S703. A job operation other than printing is omitted due to space limitations of the specification, but, the CPU 111 appropriately performs cancellation processing (not illustrated), in a case where a Cancel-Job operation is received, for example. The processing in step S702 is an example of processing for determining whether the received print job satisfies a predetermined condition.

In step S703, the CPU 111 executes print processing based on the received print job in cooperation with the printing unit 120. If the print processing is completed and the printed material is output to a paper discharge tray (not illustrated), the processing proceeds to step S704. In step S704, the CPU 111 transmits a response indicating the execution result of the print job to the client terminal 102, which is a transmission source of the print job, and terminates the series of reception processing.

In step S705, the CPU 111 acquires the operation setting indicating the IPP job storage destination from the storage 114. Then, in step S706, the CPU 111 determines which storage function the IPP storage job is to be associated with and stored based on the operation setting indicating the job storage destination acquired in step S705. Specifically, in a case where the box storage function is specified in the operation setting indicating the job storage destination, the CPU 111 determines that the storage destination is the box storage function (BOX STORAGE FUNCTION in step S706), and the processing proceeds to step S707. In a case where the hold printing function is specified in the operation setting indicating the job storage destination, the CPU 111 determines that the storage destination is the hold printing function (HOLD PRINTING FUNCTION in step S706), and the processing proceeds to step S708.

Finally, in a case where the IPP Hold-Job function is specified in the operation setting indicating the job storage destination, the CPU 111 determines that the IPP Hold-Job function is specified as the storage destination (IPP HOLD-JOB FUNCTION in step S706), and the processing proceeds to step S710. Although it is omitted due to space limitations of the specification, the CPU 111 discards the received print job and the processing to step S704, in a case where the job storage destination is set to NULL or none.

In step S707, the CPU 111 stores the print job in association with the box storage function. Specifically, the CPU 111 converts the print job in the IPP format into a file in a raster format, which is a file format supported by the box storage function, and print setting data, and stores the file and data as files that can be handled by the box storage function.

In step S708, the CPU 111 refers to the attribute information of the print job and tries to acquire user information of the user who has transmitted the job. Specifically, the CPU 111 acquires information of "requesting-user-name" included in the capability inquiry request. In step S709, the CPU 111 stores the IPP print job in association with the hold printing function. Specifically, the CPU 111 converts the print job in the IPP format into a job data format internally managed by the MFP 101 and stores the print job as a print job that can be handled by the hold printing function. At this time, the CPU 111 stores the print job in which the user information acquired in step S708 is set as information indicating an owner of the print job.

In step S708, the CPU 111 may acquire the user information included in a job-originating-user-name attribute or a requesting-user-url attribute, which are other IPP job attributes. In the process of the print sequence based on the IPP, user authentication may be performed in advance using, for example, basic authentication, digest authentication, or other authorization using Hypertext Transfer Protocol (HTTP) communication. In a case where the user authentication is performed, the owner of the print job may be identified using the information of the user who is successfully authenticated in the user authentication in advance.

Although it is omitted due to space limitations of the specification, there is a case where user information cannot be specified despite an attempt to acquire user information in step S708. In this case, the print job of which the user information cannot be specified can be canceled as an unspecified user job. Further, the unspecified user job may be stored as a common job that can be accessed by each user who uses the MFP 101.

In step S710, the CPU 111 stores the IPP print job in association with the IPP Hold-Job function. After each storing processing in step S707, S708, or S710 is completed, the CPU 111 performs the processing in step S704 described above and terminates the series of processing.

According to the above-described processing, the print job specified to be stored by the IPP or the like can be stored in association with the storage function corresponding to the operation setting set in advance by a user who has the administrator authority. Data corresponding to the print job stored in association with any of the storage functions by the storage processing can be printed via one of the output selection screens described with reference to FIGS. 5A to 5C.

According to a second exemplary embodiment, a mechanism to specify a storage area of a print job using an IPP vendor extension area is described. A hardware configuration of each apparatus according to the second exemplary embodiment is similar to that according to the first exemplary embodiment. Differences from the first exemplary embodiment are described below.

Vendor extension defines an attribute not specified in the standard specifications of the IPP and performs an arbitrary print setting. A module that interprets a unique attribute is installed on both a transmission side (a print client side) and a reception side (a printer side), and thus a vendor-specific extended print setting that is not commonly defined can be realized. The vendor-specific attribute is also referred to as vendor-defined attribute information.

A mechanism for performing the extended print setting in an IPP print client is described in detail. For example, a standard IPP client for performing IPP printing preinstalled in Windows® 11 can be associated with a Print Support Application (PSA) for supporting a vendor-specific print setting. A printer vendor that develops the MFP 101 provides an OS vendor with the PSA corresponding to the MFP 101. The OS vendor uploads the PSA that is a universal Windows® platform (UWP) application provided by the printer vendor to an update server. The OS (Windows® 11) installed on the client terminal acquires the PSA from the update server in a case where a user operation for using the MFP 101 is received using the standard IPP client. The OS of the client terminal then installs the PSA on the client terminal and associates the PSA with the standard IPP client. The associated PSA provides a print setting screen for the vendor-specific setting, based on the vendor extension attribute. Further, the PSA provides a function of changing the setting of the IPP print job according to convenience of the vendor based on the setting performed via the print setting screen.

A method of notifying the PSA of the attribute information of the vendor extension (capability information for performing the extended print setting) is described with reference to FIGS. 10A and 10B. FIG. 10A illustrates an example of a capability response packet for the MFP 101 to respond to an external terminal, such as the client terminal 102, according to the present exemplary embodiment. According to the present exemplary embodiment, the capability response includes a unique attribute, such as "cn-job-storage-destination-supported" as exemplified in an item 1001. The unique attribute is an attribute indicating the storage function that can be used as a destination. The MFP 101 lists keywords indicating storage destination information for specifying the storage function that can be used as a destination as an attribute value of the unique attribute. According to the present exemplary embodiment, specifically, keywords, such as "Box Space", "Retention Space", and "IPP Hold Job Space", are listed. The keyword "Box Space" corresponds to the box storage function. The keyword "Retention Space" corresponds to the hold printing function. The keyword "IPP Hold Job Space" corresponds to the IPP Hold-Job function.

Figure 11:
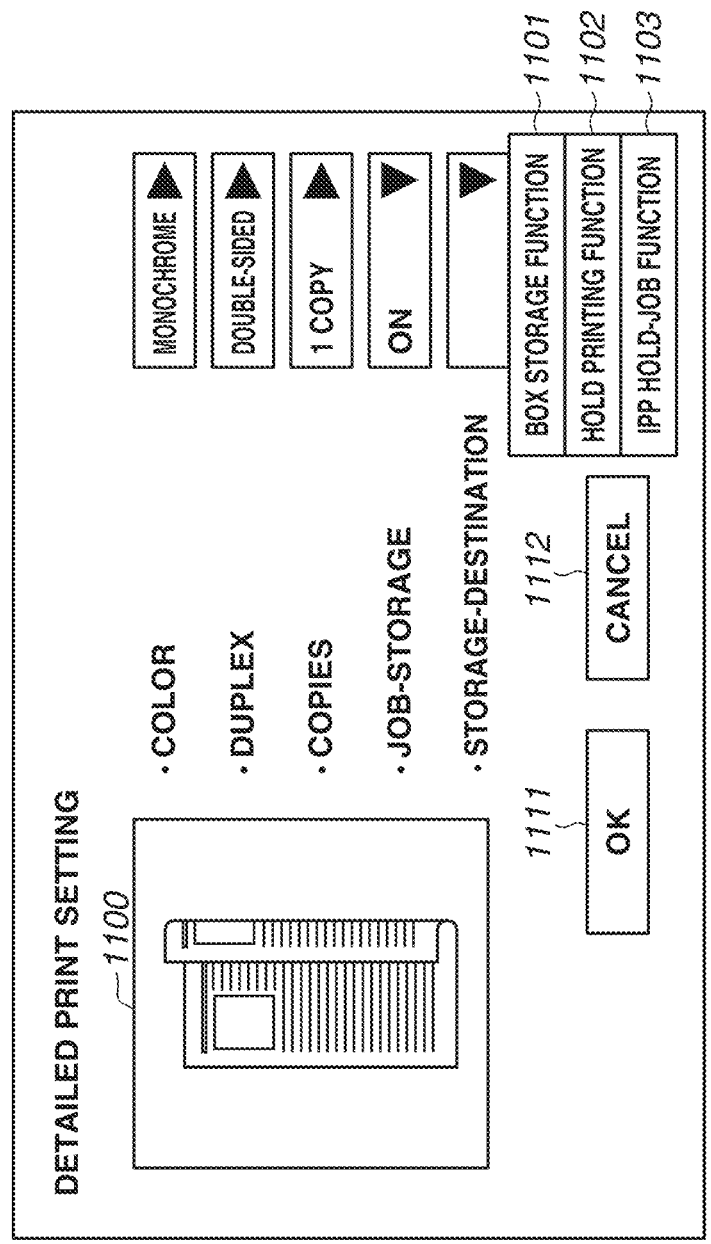
FIG. 11 illustrates an example of a screen displayed on a client terminal according to the second exemplary embodiment.

The PSA of the client terminal 102 that receives the response interprets the vendor extension and displays a detail setting screen illustrated in FIG. 11. FIG. 11 illustrates an example of the detail setting screen provided by the PSA for performing the vendor-specific print setting. An area 1100 is a setting preview area corresponding to the current print setting. The area 1100 can display an appearance of a printed material that makes it easy to see at a glance that the printed material is in a monochrome and double-sided mode. As described above, a highly functional print setting user interface (UI) provided by the printer vendor who is familiar with printing technology can be displayed using the PSA.

The detail setting screen also displays a setting item related to Storage-Destination, which is an item for selecting a type of the storage function, based on the attribute information of the vendor extension. A user can select a desired storage function from options 1101 to 1103 by selecting from a pull-down list corresponding to the setting item.

An OK key 1111 is used to determine the setting performed via the detail setting screen. A cancel key 1112 is used to cancel the setting performed via the detail setting screen.

Upon detecting that the OK key 1111 is selected, the PSA changes the print setting to be applied to the IPP print job managed by the print client according to the convenience of the vendor. For example, in a case where the option 1101 (the box storage function) is set, the PSA adds information, such as "cn-job-storage-destination: "Box Space"" to the print setting managed by the print client. If an instruction to start printing is issued via the screen provided by the print client after the PSA changes the current print setting, the print client generates a print job based on the changed print setting and transmits the print job to the MFP 101. FIG. 10B illustrates an example of a print job packet to be transmitted after the print setting is changed appropriately. The packet includes attribute information 1002 added by the PSA.

According to the second exemplary embodiment as described above, the vendor extension attribute is provided to the IPP client that can associate a print support application for providing vendor-specific functionality. Processing to be executed by the MFP 101 in a case where a print job including the vendor extension attribute is received will be described with reference to FIG. 12.

Figure 12:
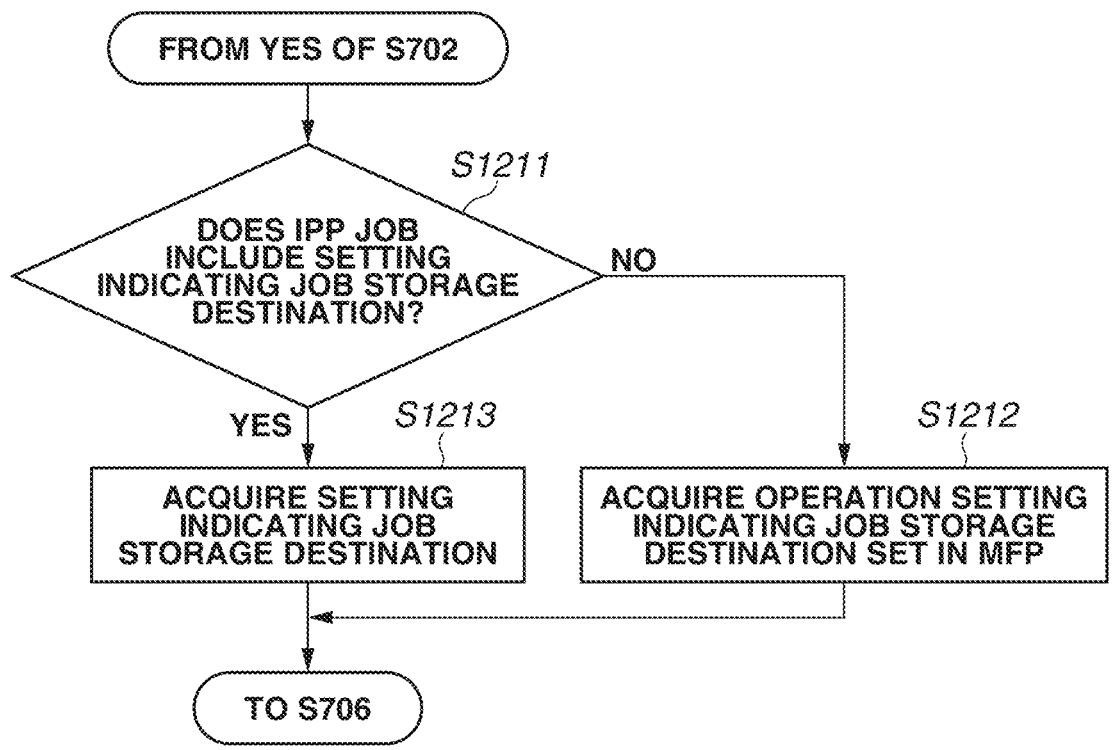
FIG. 12 is a flowchart illustrating an example of control executed by an MFP according to the second exemplary embodiment.

FIG. 12 is a flowchart illustrating IPP print data reception processing in the MFP 101, which is an example of additional processing performed in addition to each processing in FIG. 7 according to the first exemplary embodiment. According to the second exemplary embodiment, the processing in steps S1211 to S1213 is executed instead of the processing in step S705 described with reference to FIG. 7 according to the first exemplary embodiment.

The processing performed in steps S701 and S702 is the same as that according to the first exemplary embodiment. In a case where it is determined that storing is specified (YES in step S702), the processing proceeds to step S1211.

In step S1211, the CPU 111 determines whether the IPP job includes a setting indicating the job storage destination. Specifically, the CPU 111 determines whether the job attribute of the IPP job includes an attribute value corresponding to the attribute information, such as "cn-job-storage-destination". In a case where it is determined that the attribute value is included (YES in step S1211), the processing proceeds to step S1213. In a case where it is determined that the attribute value is not included (NO in step S1211), the processing proceeds to step S1212.

In step S1212, the CPU 111 acquires the operation setting indicating the IPP job storage destination from the storage 114 as in step S705, and the processing proceeds to step S706.

In contrast in step S1213, the CPU 111 acquires the setting indicating the job storage destination included in the IPP job, and the processing proceeds to step S706. The processing for determining the job storage destination in step S706 and subsequent steps is the same as that according to the first exemplary embodiment, so the description is omitted.

According to the above-described processing, the setting indicating the job storage destination can be used preferentially, in a case where the IPP job includes the setting indicating the job storage destination. Thus, the print job data can be stored in association with the job storage destination specified by a user operation using the PSA, in a case where the job storage destination is specified by the user operation using the PSA.

According to the present exemplary embodiment, the case is described as the example in which whether the print job is specified to be stored in step S702 is determined based on whether "Hold-Job" is specified in the operation. However, the determination is not limited to this. For example, it is also conceivable to perform implementation in which an attribute tag related to the Job-Storage function is added to a print job of a create-job operation. In consideration of this case, it is also possible to determine whether there is an attribute tag related to the Job-Storage, and whether a print job is specified to be stored based on a content of the attribute tag. For example, in a case where an attribute tag "job-storage-disposition: store-only" or "job-storage-disposition: print-and-store" is specified, the print job may be determined as a storage job. In this regard, "print-and-store" is an attribute value indicating that both printing and storing are performed. Thus, in a case where this attribute value is specified, the MFP 101 performs print processing based on the IPP job in response to reception of the IPP job and also performs storage processing, which is executed in a case where it is determined YES in step S702. The MFP 101 may be configured to determine that a print job is specified to be stored in a case where the job-storage-disposition attribute is not included and another attribute related to job-storage is included.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-196002, filed Dec. 2, 2021, which is hereby incorporated by reference herein in its entirety.

What is claimed is:

1. An image processing apparatus having a plurality of output management functions including at least a first output management function having a process for storing data corresponding to a print job received from other device and a process for outputting the stored data in accordance with an operation performed by a user, and a second output management function including the process for storing and the process for outputting, the second output management function being different from the first output management function, the image processing apparatus comprising:
one or more memories that store instructions; and
one or more processors configured to execute the instructions stored in the one or more memories to:
set, based on a user operation, which output management function of the plurality of output management functions handles a print job that satisfies a predetermined condition; and
in a case where a print job that satisfies the predetermined condition is received, perform control such that data corresponding to the received print job is handled by the output management function set by the setting, wherein the data corresponding to the received print job is handled by the first output management function in a case where the first output management function is set by the setting to perform the handling, and the data corresponding to the received print job is handled by the second output management function in a case where the second output management function is set by the setting to perform the handling.

2. The image processing apparatus according to claim 1, wherein a print job that satisfies the predetermined condition is a print job that conforms to an Internet Printing Protocol (IPP) and in which a Hold-Job operation is specified.

3. The image processing apparatus according to claim 2, wherein, in a case where the image processing apparatus performs a setting indicating that a print job that satisfies the predetermined condition is not handled by any of the output management functions, and a print job that satisfies the predetermined condition is received, the image processing apparatus discards the received print job.

4. The image processing apparatus according to claim 3, wherein the one or more processors execute the instructions stored in the one or more memories to, in a case where the image processing apparatus performs a setting indicating that a print job that satisfies the predetermined condition is handled by any of the output management functions, provide attribute information indicating that Job-Storage is supported to a client terminal conforming to the IPP,
wherein, in a case where the image processing apparatus performs the setting indicating that the print job that satisfies the predetermined condition is not handled by any of the output management functions, the image processing apparatus does not provide the attribute information indicating that the Hold-Job operation is supported to the client terminal conforming to the IPP.

5. The image processing apparatus according to claim 4, wherein, in a case where the image processing apparatus performs the setting indicating that a print job that satisfies the predetermined condition is handled by any of the output management functions, the image processing apparatus further provides attribute information indicating that the first output management function and the second output management function are supported as vendor-defined attribute information.

6. The image processing apparatus according to claim 5, wherein, even in a case where a print job that satisfies the predetermined condition is received, if the print job includes setting information corresponding to the vendor-defined attribute information provided by the image processing apparatus and specifying the output management function, the image processing apparatus performs control such that data corresponding to the received print job is managed in association with the output management function specified based on the setting information.

7. The image processing apparatus according to claim 2, wherein the plurality of output management functions further includes a third output management function provided for a purpose of managing and outputting data of a print job conforming to the IPP.

8. The image processing apparatus according to claim 1, further comprising a scanner,
wherein the first output management function is an output management function of managing a file in a bitmap format based on data obtained by reading a document with the scanner and a file obtained by converting data of a print job received from the outside into a bitmap format,
wherein the second output management function is a function of:
temporarily holding a print job received from the outside in a storage, and
providing a function of extracting a print job of a user who logs into the image processing apparatus among print jobs temporarily held in the storage, displaying a selection screen including a list of the extracted print job, and receiving a user operation to select a printing target.

9. The image processing apparatus according to claim 1, wherein the data corresponding to the received print job is stored into a storage area corresponding to the first output management function in a case where the first output management function is set by the setting to perform the handling, and
wherein the data corresponding to the received print job is stored into a storage area corresponding to the second output management function in a case where the second output management function is set by the setting to perform the handling.

10. A method for controlling an image processing apparatus having a plurality of output management functions including at least a first output management function having a process for storing data corresponding to a print job received from other device and a process for outputting the stored data in accordance with an operation performed by a user, and a second output management function including the process for storing and the process for outputting, the second output management function being different from the first output management function, the method comprising:
setting, based on a user operation, which output management function of the plurality of output management functions handles a print job that satisfies a predetermined condition; and
performing control, in a case where a print job that satisfies the predetermined condition is received, such that data corresponding to the received print job is handled by the output management function set by the setting, wherein the data corresponding to the received print job is handled by the first output management function in a case where the first output management function is set by the setting to perform the handling, and the data corresponding to the received print job is handled by the second output management function in a case where the second output management function is set by the setting to perform the handling.

11. A non-transitory computer-readable storage medium storing one or more programs including instructions, which when executed by one or more processors of the image processing apparatus, cause the image processing apparatus to perform the method according to claim 10.

* * * * *